(12) United States Patent
Khaligh

(10) Patent No.: US 8,853,888 B2
(45) Date of Patent: Oct. 7, 2014

(54) MULTIPLE-INPUT DC-DC CONVERTER

(75) Inventor: Alireza Khaligh, Chicago, IL (US)

(73) Assignee: Illinois Institute of Technology, Chicago, IL (US)

( * ) Notice: Subject to any disclaimer, the term of this patent is extended or adjusted under 35 U.S.C. 154(b) by 804 days.

(21) Appl. No.: 12/337,129

(22) Filed: Dec. 17, 2008

(65) Prior Publication Data

US 2010/0148587 A1 Jun. 17, 2010

(51) Int. Cl.
*H02J 1/00* (2006.01)
*H02M 1/10* (2006.01)
*H02M 3/158* (2006.01)

(52) U.S. Cl.
CPC .............. *H02M 1/10* (2013.01); *Y02B 70/1466* (2013.01); *H02M 3/1582* (2013.01); *H02M 3/1588* (2013.01)
USPC ................... 307/80; 307/52; 307/72; 307/82; 363/123; 323/282

(58) Field of Classification Search
USPC ............ 307/72, 52, 80, 82; 363/123; 323/282
See application file for complete search history.

(56) References Cited

U.S. PATENT DOCUMENTS

| | | | |
|---|---|---|---|
| 4,232,363 A | 11/1980 | Higuchi et al. | |
| 5,179,508 A | 1/1993 | Lange et al. | |
| 5,602,462 A | 2/1997 | Stich et al. | |
| 5,638,540 A | 6/1997 | Aldous | |
| 5,895,982 A | 4/1999 | Eng | |
| 6,069,804 A * | 5/2000 | Ingman et al. | 363/21.14 |
| 6,166,527 A | 12/2000 | Dwelley et al. | |
| 6,268,666 B1 * | 7/2001 | Bhowmik | 307/72 |
| 6,290,012 B1 * | 9/2001 | Matsubara et al. | 180/65.26 |
| 6,320,358 B2 * | 11/2001 | Miller | 323/222 |
| 6,917,188 B2 | 7/2005 | Kernahan | |
| 6,982,499 B1 | 1/2006 | Kachi et al. | |
| 7,227,277 B2 * | 6/2007 | Chapman et al. | 307/43 |
| 7,227,278 B2 | 6/2007 | Realmuto et al. | |
| 7,256,568 B2 * | 8/2007 | Lam et al. | 323/222 |
| 7,348,767 B2 * | 3/2008 | Hack et al. | 323/316 |
| 7,709,976 B2 * | 5/2010 | Bazinet | 307/85 |
| 2001/0004205 A1 * | 6/2001 | Miller | 323/224 |
| 2004/0041548 A1 | 3/2004 | Perry | |
| 2005/0093373 A1 * | 5/2005 | Chapman et al. | 307/80 |
| 2006/0017423 A1 | 1/2006 | Frith et al. | |
| 2006/0055384 A1 | 3/2006 | Jordan et al. | |
| 2006/0152085 A1 * | 7/2006 | Flett et al. | 307/75 |

(Continued)

FOREIGN PATENT DOCUMENTS

| | | |
|---|---|---|
| GB | 2 416 606 A | 2/2006 |
| WO | WO 00/21178 | 4/2000 |
| WO | WO 2008/008143 A2 | 1/2008 |

OTHER PUBLICATIONS

B.G. Dobbs et al., "A multiple-input dc dc converter," IEEE Power Electronics Letters, vol. 1, No. 1, pp. 6-9, Mar. 2003.

(Continued)

*Primary Examiner* — Jared Fureman
*Assistant Examiner* — Alfonso Perez Borroto
(74) *Attorney, Agent, or Firm* — Pauley Petersen & Erickson

(57) ABSTRACT

A multiple-input DC-DC converter that is capable of power diversification among different energy sources with different voltage-current characteristics. The converter is capable of bidirectional operation in buck, boost and buck-boost modes and provides a positive output voltage without the need for a transformer.

12 Claims, 8 Drawing Sheets

(56) References Cited

U.S. PATENT DOCUMENTS

| | | | |
|---|---|---|---|
| 2006/0266256 | A1 | 11/2006 | Donnelly et al. |
| 2007/0278860 | A1 | 12/2007 | Krieger et al. |
| 2008/0013351 | A1* | 1/2008 | Alexander ............... 363/123 |
| 2008/0111526 | A1 | 5/2008 | Shuey |
| 2008/0143188 | A1* | 6/2008 | Adest et al. ............... 307/82 |
| 2008/0218104 | A1 | 9/2008 | Lukic et al. |
| 2008/0238383 | A1* | 10/2008 | Watanabe et al. ........... 323/271 |
| 2008/0309301 | A1* | 12/2008 | Shimada et al. ........... 323/282 |
| 2009/0103341 | A1 | 4/2009 | Lee et al. |

OTHER PUBLICATIONS

A. Di Napoli et al., "Multiple input DC-DC power converter for fuel-cell powered hybrid vehicles," in Proc. IEEE 33rd Power Electronics Specialists Conference, vol. 4, Jun. 2002, pp. 1685-1690.

L. Solero et al., "Design of multiple-input power converter for hybrid vehicles," IEEE Transactions on Power Electronics, vol. 20, Sep. 2005, 10 pages.

H. Matsuo et al., "Characteristics of the multiple-input dc-dc converter," IEEE Transactions on Industrial Electronics, vol. 51, Jun. 2004, pp. 625-631.

H. Matsuo et al., "Characteristics of the multiple-input dc-dc converter," in Proc. IEEE 24th Power Electronics Specialists Conference, Jun. 1993, pp. 115-120.

G.J. Su et al., "Experimental evaluation of a soft-switching dc-dc converter for fuel cell applications," in Proc. IEEE Power Electronics in Transportation, 2002, pp. 39-44. (the year of publication is sufficiently earlier than the effective U.S. filing date so that the particular month of publication is not in issue).

L. Solero, "Performance of a 10 kW power electronic interface for combined wind/PV isolated generating systems," in Proc. IEEE PESC '96, 1996, pp. 1027-1032. (the year of publication is sufficiently earlier than the effective U.S. filing date so that the particular month of publication is not in issue).

F. Caricchi, "Testing of a new dc-dc converter topology for integrated wind-photovoltaic generating systems," in Proc. European Conf. Power Elect. and Applns, 1993, pp. 83-88 (the year of publicaiton is sufficiently earlier then the effective U.S. filing so that the particular month of publication is not in issue).

D. Liu et al., "A novel multiple-input ZVS bidirectional dc-dc converter," in Proc. IEEE 32nd Annual Conference of Industrial Electronics Society, Nov. 2005, pp. 579-584.

Y. M. Chen et al., "Multi-input dc/dc converter based on the multiwinding transformer for renewable energy applications," IEEE Transactions on Industry Applications, vol. 38, Jul.-Aug. 2002, pp. 1096-1104.

N. Benavides et al., "Power budgeting of a multiple-input buck-boost converter," IEEE Transactions on Power Electronics, vol. 20, Nov. 2005, pp. 1303-1309.

A. Kwasinski et al., "A microgrid-based telecom power system using modular multiple-input dc-dc converters," in Proc. IEEE 27th Int'l Telecom. Confr., Sep. 2005, pp. 515-520.

M. Marchesoni et al., "New dc-dc converter for energy storage system interfacing in fuel cell hybrid electric vehicles," IEEE Transactions on Power Electronics, vol. 22, Jan. 2007, pp. 301-308.

Y. Chen et al., "Grid-connected hybrid PV/wind power generation system with improved dc bus voltage regulation strategy," in Proc. IEEE 21st Annual Applied Power electronics conference and Exposition, Mar. 2006, pp. 1088-1094.

F. Caricchi et al., "Study of bi-directional buck-boost converter topologies for application in electrical vehicle motor drives," in Proc. IEEE 13th Applied Power Electronics Conference, Feb. 1998, pp. 287-293.

M. Marchesoni et al., "A New DC-DC Converter Structure for Power Flow Management in Fuel-Cell Electric Vehicles with Energy Storage Systems," IEEE 35th Power Elect. Specialists Conference, Jun. 2004, pp. 683-689.

N. Benavides et al., "Ripple correlation control of a multiple-input dc-dc converter," Proc. IEEE 36th Power Electronics Specialists Conference, Jun. 2005, pp. 160-164.

H. Matsuo et al., "Suppression of the Input Current Harmonics and Output Voltage Ripple Using the Novel Multiple-Input AC-DC Converter," in Proc. IEEE 19th Telecom. Energy Conference, Oct. 1997, pp. 710-714.

A. Khaligh, "A Multiple-Input Dc-Dc Positive Buck-Boost Converter Topology," in Proc. IEEE 33rd Applied Power Elect. Conference, Austin, TX, Feb. 2008, pp. 1522-18526.

Co-Pending U.S. Appl. No. 12/337,211, filed Dec. 17, 2008.

* cited by examiner

MULTIPLE-INPUT DC-DC CONVERTER

BACKGROUND OF THE INVENTION

1. Field of the Invention

This invention relates generally to power conversion and particularly to a multiple-input DC-DC converter which is capable of power diversification among different energy sources with different voltage-current characteristics, while achieving bidirectional operation and a positive voltage output.

2. Discussion of Related Art

DC-DC converters are used to convert a source of direct current (DC) from one voltage level to another. Multiple-input converters have the capability to combine the advantages of different energy sources, such as photovoltaic cells, fuel cells, wind power devices, batteries, ultracapacitors and other renewable energy sources, with different voltage and current characteristics to provide power and for optimal energy/economic use while increasing the reliability of a system. Multiple-input converters are useful in many systems/applications including grid connected integrated hybrid generation systems, fuel cells, micro grid-based telecom power systems, uninterruptible power supplies, and electric or hybrid electric vehicles.

Known multiple-input converters are useful for combining several energy sources, with varied power capacity and/or voltage levels, to obtain a regulated output voltage. A common limitation of some known multiple input converters is that only one input power source is allowed to transfer energy into an output at a time to prevent power coupling effects.

Other known converters overcome the above limitation by utilizing a transformer with separate windings for each input. This type converter can also accommodate multiple-outputs by using multiple secondary windings. In this way, any input can provide energy to any output, and there is electrical isolation among all inputs and outputs. However, this type of converter requires a large transformer core to accommodate all of these windings, making the design big and costly.

Current-fed multiple-input converters can transfer energy from different power sources into a load through a multi-winding transformer, however, these converters require a large number of power switches and a complicated gate drive circuit and controller. Thus, these converters have a relatively high cost and a large number of parts.

Another type of multiple-input converter has a negatively referenced output and is unidirectional. The output could be reversed by utilizing a transformer, which adds to the cost and size of the topology. In order to make this type of converter bidirectional, it is expected that an additional converter from the output to each input would be required.

There is a need for a multiple-input converter which is capable of combining different energy sources, with bidirectional operation and while achieving a low parts number.

SUMMARY OF THE INVENTION

A general object of the invention is to provide a multiple-input energy conversion topology which is capable of combining different energy sources with different voltage-current characteristics and operating, bidirectionally, in buck, boost and buck-boost modes.

This invention, a multiple-input bidirectional positive buck-boost converter, comprises a plurality of voltage inputs. Each of the plurality of voltage inputs may be or from a voltage source. Type of available voltage sources include, but are not limited to, photovoltaic cells, fuel cells, batteries, ultracapacitors, solar cells, wind power devices and other renewable energy sources, and combinations thereof.

Each of the voltage inputs is electrically connected to a unique bidirectional switch. Each bidirectional switch can be a pair of switching devices connected anti-parallel (parallel devices with their polarities reversed) to one another.

Each bidirectional switch is electrically connected to an inductive device, such as an inductor. The inductive device is electrically connected to a plurality of converter switches. Each of the plurality of converter switches can include a switching device and a diode.

The invention provides a voltage output that is bucked, boosted or buck-boosted, relative to at least one of the voltage inputs, by turning on, turning off or switching each of the plurality of converter switches and bidirectional switches. The invention provides the voltage output with a same polarity as a polarity of the voltage inputs.

BRIEF DESCRIPTION OF THE DRAWINGS

These and other objects and features of this invention will be better understood from the following detailed description taken in conjunction with the drawings, wherein.

DESCRIPTION OF PREFERRED EMBODIMENTS

Figure 1:
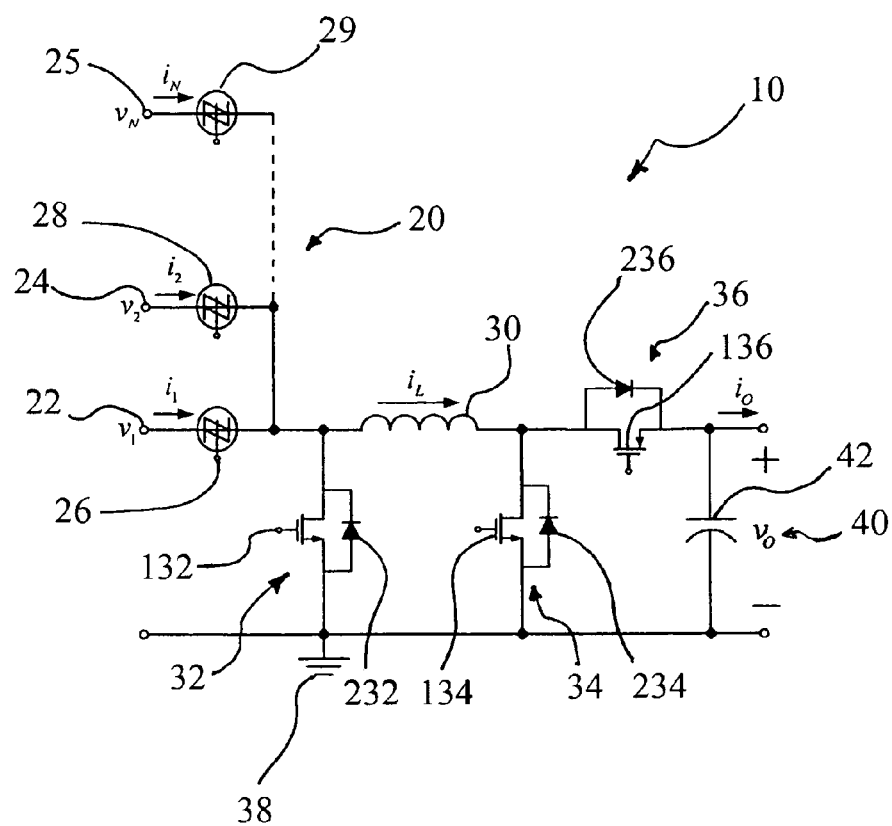
FIG. 1 shows a circuit diagram of a multiple-input positive buck-boost converter according to one embodiment of this invention.

FIG. 1 shows converter 10, which is a multiple-input bidirectional positive buck-boost converter 10 according to one embodiment of this invention. Converter 10 provides positive voltage output 40 ($v_o$) and can operate in three modes: buck (voltage step down); boost (voltage step up); and buck-boost modes (both voltage step down and voltage step up) and utilizes a small number of parts. Further, converter 10 can operate bidirectionally.

Converter 10 comprises converter input 20, which can include any number of input voltages ($v_N$) 25. Converter 10 further includes a number of bidirectional switches 29 equal to the number of input voltages. The operation of converter 10, with reference to FIGS. 2-5, will be described with reference to first input voltage 22 ($v_1$), second input voltage 24 ($v_2$), first bidirectional switch 26 and second bidirectional switch 28.

Input voltages 22, 24 allow converter 10 to utilize multiple and diverse voltage sources, with different voltage and current characteristics, thereby increasing the reliability of a system and allowing the system to achieve optimal and efficient use of energy in a cost effective manner. Voltage sources for input voltages 22, 24 include, but are not limited to, photovoltaic cells, fuel cells, batteries, ultracapacitors, solar cells, wind power devices and other renewable energy sources, and combinations thereof. Systems which could benefit by using converter 10 include, but are not limited to, grid connected integrated hybrid generation systems, fuel cells, micro grid-based telecom power systems, uninterruptable power supplies, electric vehicles and hybrid vehicles.

In the embodiment of FIG. 1, first input voltage 22 is electrically connected to first bidirectional switch 26 and second voltage input 24 is electrically connected to second bidirectional switch 28. In one embodiment, each bidirectional switch 26, 28 comprises parallel switching devices which allow switching and bidirectional conduction. Each bidirectional switch 26, 28 can include or be any device or devices that allow individual switching and bidirectional conduction such as, without limitation, a metal-oxide-semiconductor field-effect transistor (MOSFET), a bipolar junction transistor (BJT) and junction-gate field effect transistor (JFET). However, any device or devices that provide switching for bidirectional conduction and bidirectional blocking can be used.

An output from each of first bidirectional switch 26 and second bidirectional switch 28 are electrically connected to form an output from converter input 20. The output from converter input 20 splits to provide two circuit paths, a first switch path and an inductor circuit path. The first switch path connects to first switch 32 and then to ground 38. The inductor circuit path connects an inductive device 30 and from inductive device 30 splits into two more paths, a second switch path and a third switch path. The second switch path connects to second switch 34 and then to ground 38. The third switch path connects to third switch 36 and then to voltage output 40 in connection with capacitor 42.

In one embodiment, inductive device 30 is desirably an inductor, but can alternatively be a transformer.

As shown in FIG. 1, each switch includes a transistor and a diode. First switch 32 includes transistor 132 and diode 232. Second switch 34 includes transistor 134 and diode 234. Third switch 36 includes transistor 136 and diode 236. Alternatively, each transistor 132, 134, 136 can be any device or devices to provide switching including, without limitation, a MOSFET, a BJT and a JFET.

Converter 10 has the flexibility to operate in buck mode, boost mode and buck-boost mode, as well as bidirectionally, through control of the switching of transistors 132, 134, 136, first bidirectional switch 26 and/or second bidirectional switch 28. Switching is controlled by an input control circuit (not shown) in electrical connection with each of transistors 132, 134, 136, first bidirectional switch 26 and second bidirectional switch 28. The input control circuitry desirably includes a microprocessor. The input control circuitry receives input data, including the voltage inputs 22, 24 and the desired voltage output 40, to determine if a particular switch should be "on," i.e., conducting, or "off," i.e., not conducting, or switched "on" for a respective duty cycle (D) and "off" for a remainder of a period (T). The use of "on" and "off" for the switches is intended to convey that each switch must receive a signal from the input control circuitry in order to conduct, whereas a diode will change from conducting to blocking (not conducting), and vice-versa, automatically.

Figure 2:
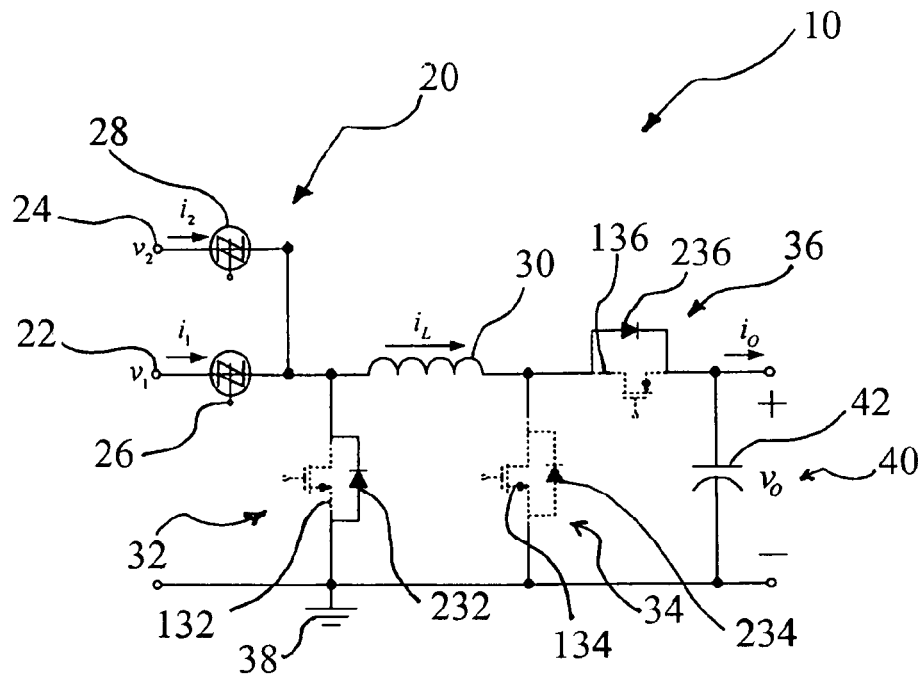
FIG. 2 shows the converter of FIG. 1 in a buck mode, with components which are not conducting in this mode shown as dashed lines.

In a buck mode topology, as shown in FIG. 2, converter 10 steps-down one or more input voltages 22, 24 to a desired output voltage. The input control circuitry switches off transistor 134 of second switch 34 and transistor 136 of third switch 36. Diode 234 of second switch 34 is not conducting, while diode 236 of third switch 36 is conducting. The input control circuitry switches first bidirectional switch 26 and/or second bidirectional switch 28 and, in response, diode 232 of first switch 32 automatically alternates between states of conducting and not conducting.

Figure 3:
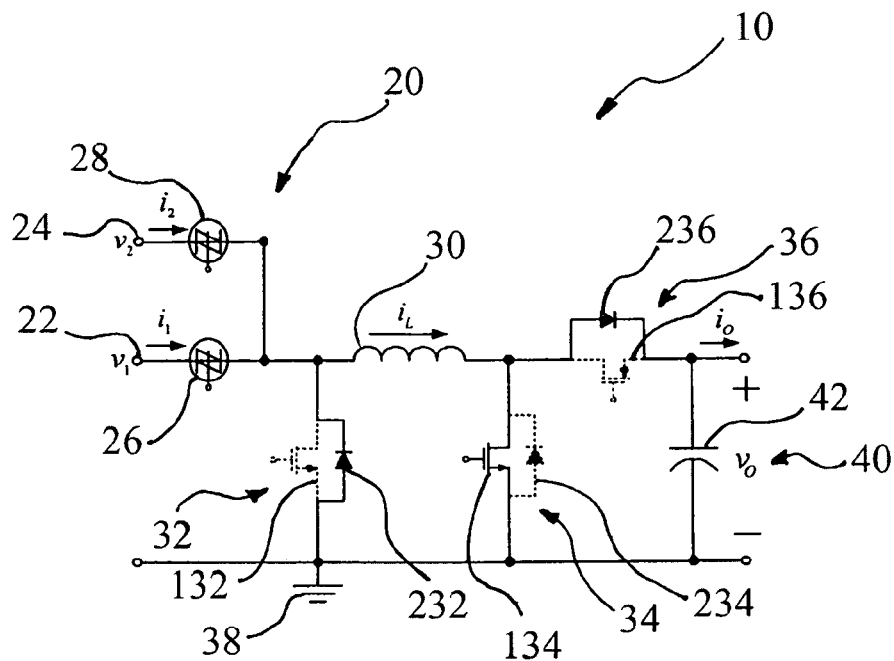
FIG. 3 shows the converter of FIG. 1 in a buck-boost mode, with components which are not conducting in this mode shown as dashed lines.

FIG. 3 shows a circuit operating topology for a buck-boost mode. The buck-boost mode allows converter 10 to either step-up or step-down one or more voltage inputs. In FIG. 3, transistor 132 of first switch 32 and transistor 136 of third switch 36 are off. Diode 234 of second switch 34 is not conducting. First bidirectional switch 26 and/or second bidirectional switch 28 and transistor 134 of second switch 34 are switched on for a duty cycle and then off and, in response, diode 232 of first switch 32 and diode 236 of third switch 36 alternate between states of conducting and not conducting.

Figure 4:
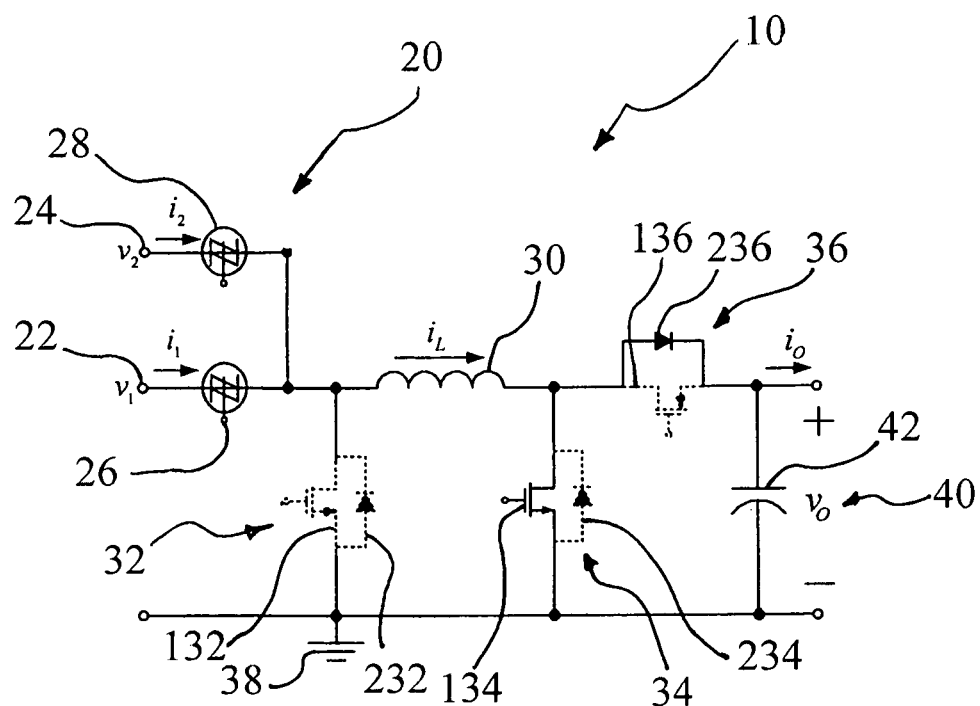
FIG. 4 shows the converter of FIG. 1 in a boost mode, with components which are not conducting in this mode shown as dashed lines.

An operation of converter in boost mode, as shown in FIG. 4, is only possible with one input voltage, either first input voltage 22 or second input voltage 24, at a time. In other words, either first bidirectional switch 26 or second bidirectional switch 28 is on. The boost mode allows converter 10 to step-up the voltage input 20. In boost mode, transistor 132 of first switch 32 and transistor 136 of third switch 36 are off. Diode 232 of first switch 32 and diode 234 of second switch 34 are not conducting. Transistor 134 of second switch 34 is switched and, in response, diode 236 of third switch 36 alternates between states of conducting and not conducting.

Figure 5:
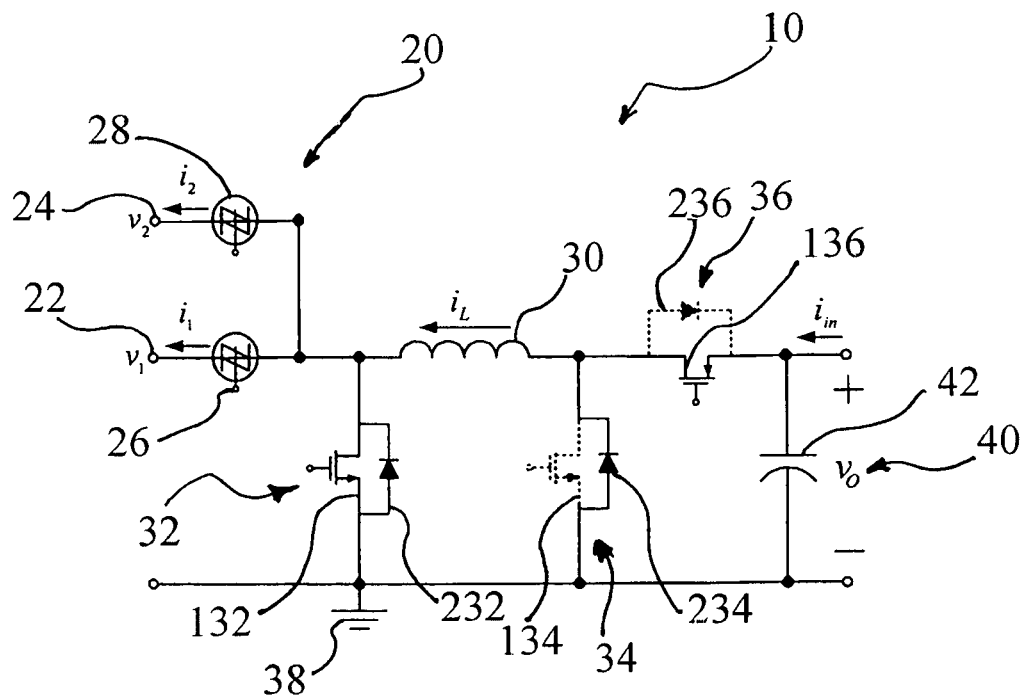
FIG. 5 shows the converter of FIG. 1 having an energy flow from an output voltage to an input voltage, with components which are not conducting in this mode shown as dashed lines.

A topology of converter 10 for reverse energy transfer from the output to the input is shown in FIG. 5. This topology is useful for recharging input voltage 22 and/or input voltage 24 from a generating device connected at voltage output 40. One example of such a generating device is a regenerative braking system commonly used in hybrid electric vehicle applications. In the topology shown in FIG. 5, converter 10 can operate as a buck, a boost or a buck-boost converter, but can only charge one input voltage 22, 24 source at a time.

In the reverse energy transfer buck mode, transistor 136 of third switching device 36 is switched and, in response, diode 234 of second switching device 34 alternates between conducting and not conducting. Transistor 132 and diode 232 of first switching device 32 are off, and either first bidirectional switch 26 or second bidirectional switch 28 are on, depending on whether first input voltage 22 or second input voltage 24 is being charged.

In the reverse energy transfer boost mode, the input control circuitry turns transistor 136 on, and switches between transistor 132 and either first bidirectional switch 26 or second bidirectional switch 28 depending on whether first input voltage 22 or second input voltage 24 is being charged.

In the reverse energy transfer buck-boost mode, the input control circuitry switches between either the pair of transistor 132 and transistor 136 or the pair of one of bidirectional switch 26, 28 (depending on whether first input voltage 22 or second input voltage 24 is being charged) and diode 234 of second switching device 34.

Converter 10 can operate in both a continuous conduction mode (CCM) and a discontinuous conduction mode (DCM). Where CCM is a situation where the current passing through conductor 30 fluctuates but never drops to zero amps. DCM is a situation where the current passing through inductor 30 fluctuates and drops down to zero amps.

In CCM, also referred to as steady state operation, current ($i_L$) of inductor 30 is always greater than zero. Because current ($i_L$) is always greater than zero, at all times, at least one bidirectional switch 26, 28, 29 is on or diode 232 is conducting. Hence, if at least one bidirectional switch 26, 28, 29 is on, then diode 232 is not conducting, but if all bidirectional switches 26, 28, 29 are off, then diode 232 is conducting. If several bidirectional switches 26, 28, 29 are on, then voltage of inductor 30 is equal to the highest of voltage input 22, 24, 25 (assuming its respective bidirectional switch is on) minus output voltage 40.

Defining switching signals from the input control circuitry for each duty cycle as $u_i$ (i=1:N), such that a one corresponds to the on switching state and a zero corresponds to the off switching state, and assuming that output capacitor 42 is sufficiently large so that output voltage 40 is almost constant, voltage ($v_L$) of inductor 30 is:

$$v_L = \left[\max_i(u_i V_i - u_i V_{out})\right] - V_{out} \prod_i (1 - u_i). \quad (1)$$

In a steady state operation, the average inductor voltage is zero. Setting the average of Equation (1) to zero gives:

$$V_{out} = \frac{\int_0^T \max_i(u_i V_i) dt}{\left[\int_0^T \max_i(u_i) dt + \int_0^T \prod_i (1 - u_i) dt\right]}. \quad (2)$$

Figure 6:
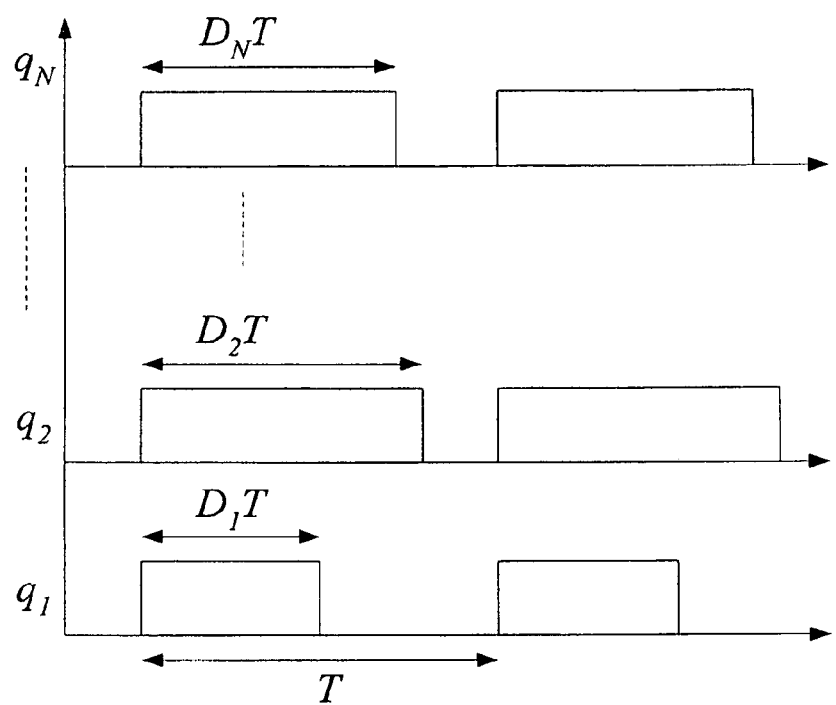
FIG. 6 illustrates a representative switching strategy according to one embodiment of this invention.

FIG. 6 shows a duty cycle control scheme of one embodiment of this invention that is configured such that each bidirectional switch 26, 28, 29 switches at the same frequency and a leading edge of each switch signal, $u_i$, coincides. In this configuration, Equation (2) simplifies to:

$$V_{out} = \frac{\sum_i D_{eff(i)} V_i}{\max_i(D_i) + \left[1 - \max_i(D_i)\right]} = \sum_i D_{eff(i)} V_i, \quad (3)$$

where $D_{eff(i)}$ is an effective duty cycle of each bidirectional switch 26, 28, 29, where the duty cycle is a portion of time bidirectional switch conducts nonzero current. If the voltage indices are arbitrarily ordered such that $V_1 > V_2 > \ldots > V_N$, then:

$$D_{eff(i)} = \begin{cases} 0, & D_i < \sum_{j=1}^{i-1} D_{eff(j)} \\ D_i - \sum_{j=1}^{i-1} D_{eff(j)}, & D_i \geq \sum_{j=1}^{i-1} D_{eff(j)}. \end{cases} \quad (4)$$

For example, in two-input converter 10, if $D_1 > D_2$, then:

$$V_{out} = D_1 V_1 \quad (5)$$

which is the same as the output voltage for a single-input normal buck converter, because the second input voltage (lower voltage) does not enter in. Conversely, if the two-input converter has $D_2 > D_1$, then:

$$V_{out} = D_1 V_1 + (D_2 - D_1) V_2. \quad (6)$$

Equation (6) shows the simultaneous operation of both inputs.

In DCM the current ($i_L$) of the inductor 30 goes to zero before the end of a cycle. Similar to the CCM, if more than one bidirectional switch 26, 28, 29 is on, then voltage ($v_L$) of inductor 30 is equal to the highest of input voltages 22, 24, 25, for which the respective bidirectional switch 26, 28, 29 is on. Therefore, only one bidirectional switch 26, 28, 25 conducts at a time. Two different exemplary cases are provided below, and analyzed for DCM.

Case 1—Magnitude of all the Input Voltages is Higher than the Output Voltage

Figure 7:
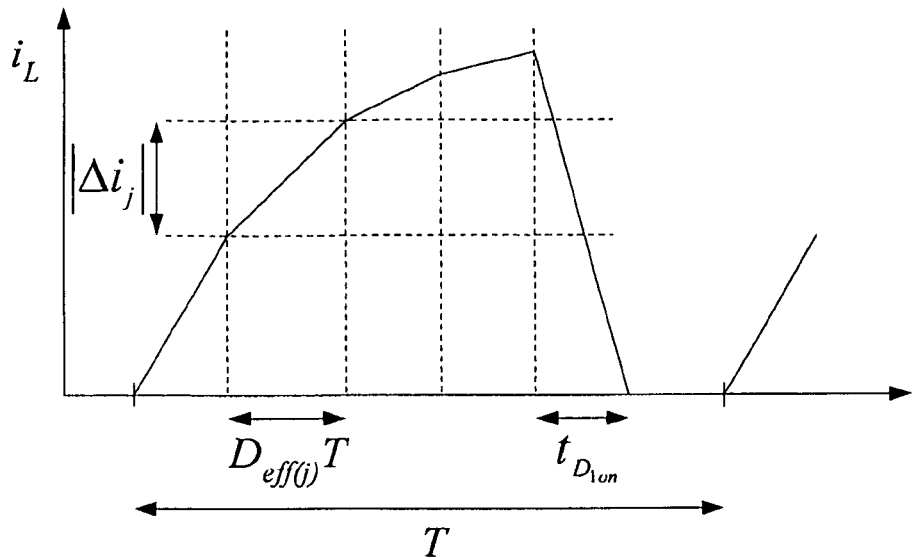
FIG. 7 is a chart of an inductor current in a first case discontinuous conduction mode according to one embodiment of this invention.

In this case, where the magnitudes of each and every input voltages 22, 24, are higher than output voltage 40, the stored energy of inductor 30, at the instant diode 232 changes from blocking to conducting, is $$\frac{1}{2} L i_p^2,$$

where change in current of inductor 30 is:

$$|\Delta i_j| = \frac{V_j - V_{out}}{L} D_{eff(j)} T, \quad (7)$$

where T is the period. The total change in current in the positive direction is the sum of all changes in the current of inductor 30. The current change versus time is shown in FIG. 7. Therefore, the magnitude of the inductor current is:

$$i_p = \sum_j |\Delta i_j| = \frac{T}{L} \sum_j D_{eff(j)} (V_j - V_{out}). \quad (8)$$

Once all bidirectional switches 26, 28, 29 are turned off, diode 232 of first switching device 32 conducts until the current of inductor 30 becomes zero. Assuming a time constant that is relatively large compared to the period, then:

$$t_{D1on} = \frac{i_p L}{V_{out}}. \tag{9}$$

Voltage ripple on capacitor 42 can be calculated by assuming a discharge that is slow compared to the switching period. The discharge occurs while all switches are off, so:

$$|\Delta v_{out}| = \frac{I_{out}}{C}\left(T - t_{D1on} - T\sum_j D_{eff(j)}\right). \tag{10}$$

All of the stored energy of inductor 30 passes to a load at voltage output 40 and capacitor 42. The voltage of capacitor 42 increases by $|\Delta v_{out}|$, from $$\frac{1}{2}C\left(V_{out} - \frac{\Delta v_{out}}{2}\right)^2$$

to $$\frac{1}{2}C\left(V_{out} + \frac{\Delta v_{out}}{2}\right)^2$$

during time $t_{D1on}$, resulting in a net energy change of $CV_{out}\Delta v_{out}$. The energy passing to the load during inductor 30 discharge is $V_{out}I_{out}t_{D1on}$. This yields an energy balance of:

$$\frac{1}{2}Li_p^2 = CV_{out}\Delta v_{out} + V_{out}I_{out}t_{D1on} \tag{11}$$

Substituting Equations (8), (9), and (10) in Equation (11), and assuming a resistive load R, then:

$$V_{out}^2\left(1 - \sum_j D_{eff(j)}\right) = \frac{RT}{2L}\left(\sum_j D_{eff(j)}(V_j - V_{out})\right)^2 \tag{12}$$

This is a second degree equation to be solved for $V_{out}$.

Case 2—the Magnitude of Some of the Input Voltages is Less than Output Voltage

Figure 8:
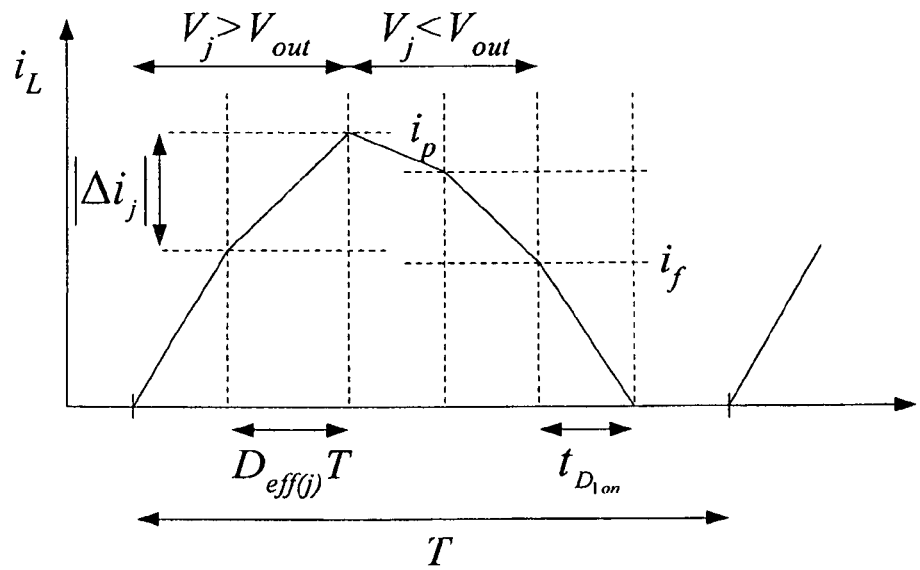
FIG. 8 is a chart of the inductor current in a second case discontinuous conduction mode according to one embodiment of this invention.

In this case, a drop in voltage output 40 happens not only while all bidirectional switches 26, 28, 29 are off but also when voltage inputs 22, 24 and/or 25 have magnitudes less than output voltage 40 and the corresponding bidirectional switch 26, 28 and/or 29 is conducting. FIG. 8 shows the current of inductor 30 in a four-input buck converter, where the first two voltage inputs have magnitudes higher than output voltage, and as a result the current of inductor increases. However, the other two inputs have magnitudes lower than the output voltage, and thus inductor current decreases. For this situation, the final value of the inductor current ($i_f$) will be different than its peak value ($i_p$):

$$i_f = \sum_j |\Delta i_j| = \frac{T}{L}\sum_j D_{eff(j)}(V_j - V_{out}) \tag{13}$$

$$i_p = \sum_j |\Delta i_j| = \frac{T}{L}\sum_j D_{eff(j)}(V_{eff(j)} - V_{out}), \tag{14}$$

where $V_{eff(j)}$ is the magnitude of one of input voltages; the one which has a magnitude greater than output voltage. Thus:

$$V_{eff(j)} = \begin{cases} V_j, & V_j > V_{out} \\ 0, & V_j < V_{out} \end{cases} \tag{15}$$

$$t_{D1on} = \frac{i_f L}{V_{out}} \tag{16}$$

$$|\Delta v_{out}| = \frac{I_{out}}{C}\left(T - t_{D1on} - T\sum_j (D_{eff(j)} - D_{noneff(j)})\right), \tag{17}$$

where $t_{D1on}$ and $|\Delta v_{out}|$ equal a time diode 232 of first switching device 32 conducts and output voltage ripple, respectively and:

$$D_{noneff(j)} = \begin{cases} D_{eff(j)}, & V_j < V_{out} \\ 0, & V_j > V_{out}. \end{cases} \tag{18}$$

The net energy change of capacitor 42 during times that all switches are off plus the time period for which voltage input is less than voltage output is $CV_{out}\Delta v_{out}$. Energy passing to a load of output voltage 40 during inductor 30 discharge is $$V_{out}I_{out}\left(t_{D1on} + \sum_j D_{noneff(j)}\right).$$

This yields the energy balance of:

$$\frac{1}{2}Li_p^2 = CV_{out}\Delta v_{out} + V_{out}I_{out}\left(t_{D1on} + \sum_j D_{noneff(j)}\right). \tag{19}$$

Substituting Equations (13) and (17) in Equation (19), yields:

$$\frac{T^2}{2L}\left(\sum_j D_{eff(j)}(V_{eff(j)} - V_{out})\right)^2 = \tag{20}$$

$$V_{out}I_{out}\left(T - \frac{i_f L}{V_{out}} - T\sum_j (D_{eff(j)} - D_{noneff(j)})\right) +$$

$$V_{out}I_{out}\left(\frac{i_f L}{V_{out}} + \sum_j D_{noneff(j)}\right)$$

Equation (20) is a conditional and nonlinear equation, which can be solved numerically to calculate output voltage.

Calculating the output voltage in the buck-boost mode, following the procedure and considering similar assumptions as used in developing the equations for the buck mode above, output voltage 40 for a resistive load R, in CCM and DCM are respectively represented in Equations (21) and (22):

$$V_{out} = \frac{\sum_i D_{eff(i)} V_i}{1 - \max_i(D_i)} \quad (21)$$

$$V_{out} = i_p \sqrt{\frac{RL}{2T}}. \quad (22)$$

Converter 10 was tested experimentally in CCM with the following elements: a 10 V first voltage input 22; a 5 V second voltage input 24; an inductor 30 with an inductance of 50 μH and 0.05 Ωdc resistance; a Rubicon 680 μF capacitor 42; an IRF9540 MOSFET for the switching devices; and a 50 kHz switching frequency.

Figure 9:
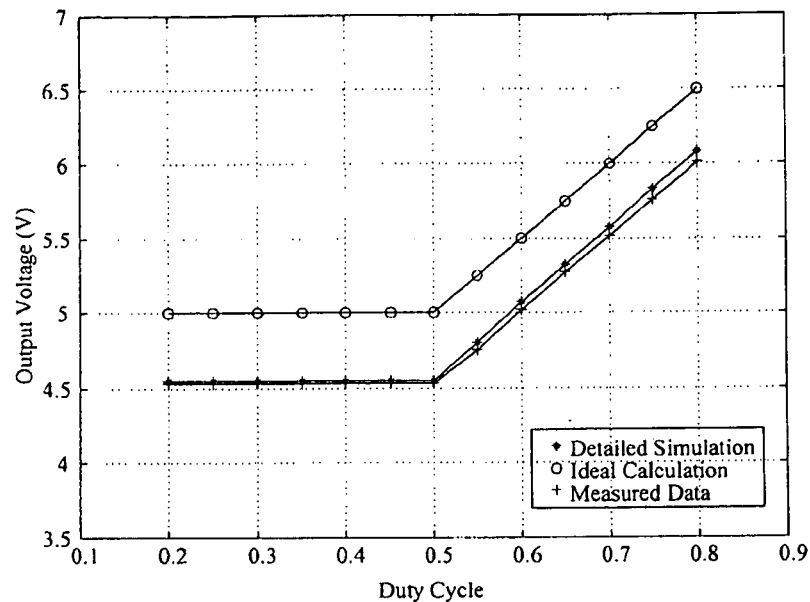
FIG. 9 is a graph of experimental results, simulated results and ideal results of the multiple-input positive buck-boost converter in a continuous conduction mode for two-input buck topology according to one embodiment of this invention.

FIG. 9 shows three plots of the average output voltage for a two-input converter in buck mode: (1) as predicted by a detailed device level simulation; (2) as calculated for the ideal case by the proposed equations; and (3) as measured value from experimental set-up.

In FIG. 9, the duty cycle ($D_1$) of the 10 V first voltage input is 0.5, while the duty cycle ($D_2$) of the 5 V second voltage input is varied. Once $D_2$ exceeds $D_1$, converter 10 does not behave like a single-input buck converter anymore. As shown in FIG. 9, output voltage increases significantly. Ideal simulation corresponds with the ideal analyses; however, device level simulation and experimental measurement show a small voltage drop in output voltage due to losses associated with non-ideal components.

In order to study the behavior of converter 10 in DCM, the switching frequency is reduced to 10 kHz, and inductance of inductor 30 is increased to 75 μH (series resistance 0.2Ω). Operation of converter 10 in buck topology was analyzed for both cases discussed above.

Figure 10:
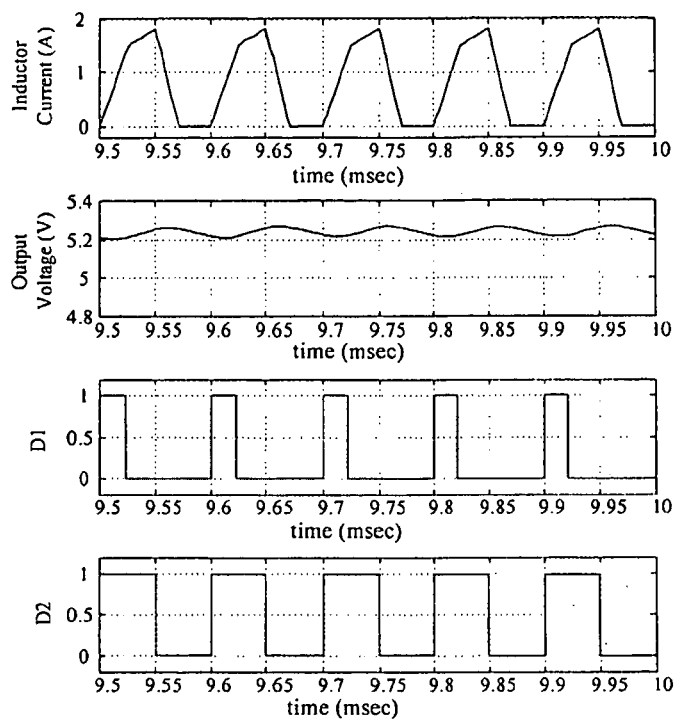
FIG. 10 is four graphs of two duty cycles, an output voltage and an inductor current of the converter in buck operating topology in a first case discontinuous conduction mode according to one embodiment of this invention.

In Case 1, two voltage inputs were chosen, 10 V and 7 V, and the magnitude of each input voltage 22, 24 is higher than output voltage 40. Output voltage 40 and the inductor current are shown in FIG. 10. The current of inductor 30 increases during both the $D_{eff(1)}T$ and $D_{eff(2)}T$ time periods, where either first bidirectional switch 26 or second bidirectional switch 28 conducts. Then during the time period where diode 232 is conducting inductor 30 current descends to zero.

Figure 11:
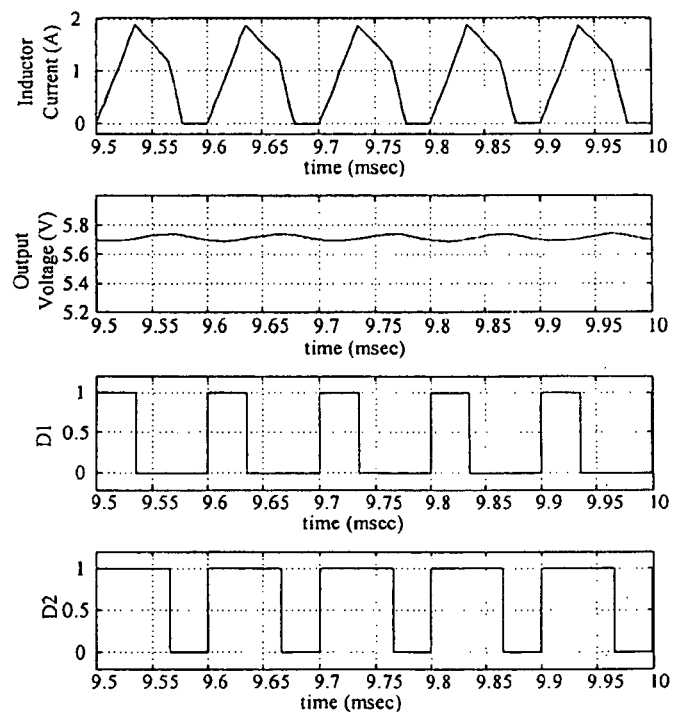
FIG. 11 is four graphs of two duty cycles, an output voltage and an inductor current of the converter in buck operating topology in a second case discontinuous conduction mode according to one embodiment of this invention.

In Case 2, the magnitude of output voltage 40 is lower than first input voltage 22 and higher than second input voltage 24. First input voltage 22 is 10 V and second input voltage 24 is 5 V, whereas the output voltage is 5.7 V. Since output voltage 40 is less than first input voltage 22 during $D_{eff(1)}T$, the current of inductor 30 increases. However, during $D_{eff(2)}T$, the current of inductor 30 decreases. Similarly, during $t_{D1on}$ the current of inductor 30 descends to zero, as shown in FIG. 11. In FIGS. 10 and 11, the output load is 6.6Ω.

Figure 12:
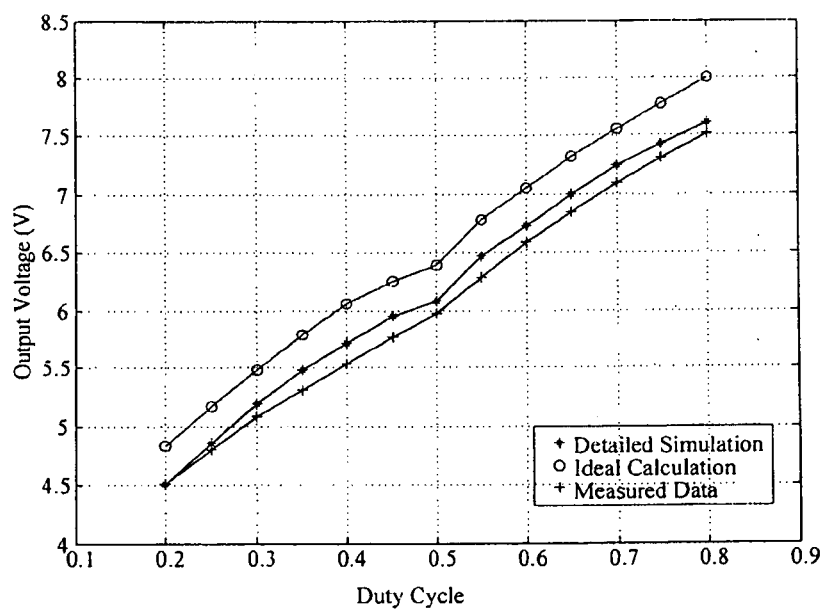
FIG. 12 is a graph of experimental results, simulated results and ideal results of the multiple-input positive buck-boost converter in a discontinuous conduction mode for two-input buck topology according to one embodiment of this invention.

FIG. 12 shows output voltage 40 of converter 10 in DCM with a first duty cycle ($D_1$) varied and a second duty cycle ($D_2$) equal to 0.5. FIG. 12 shows three plots of the average output voltage for a two-input converter in buck mode: (1) as predicted by a detailed device level simulation; (2) as calculated for the ideal case by equations obtained in analytical studies; and (3) as measured value from experimental set-up. The difference in results is mainly due to unmodeled switch drops in analytical studies. The presented simulation and analytical studies are verified experimentally.

Figure 13:
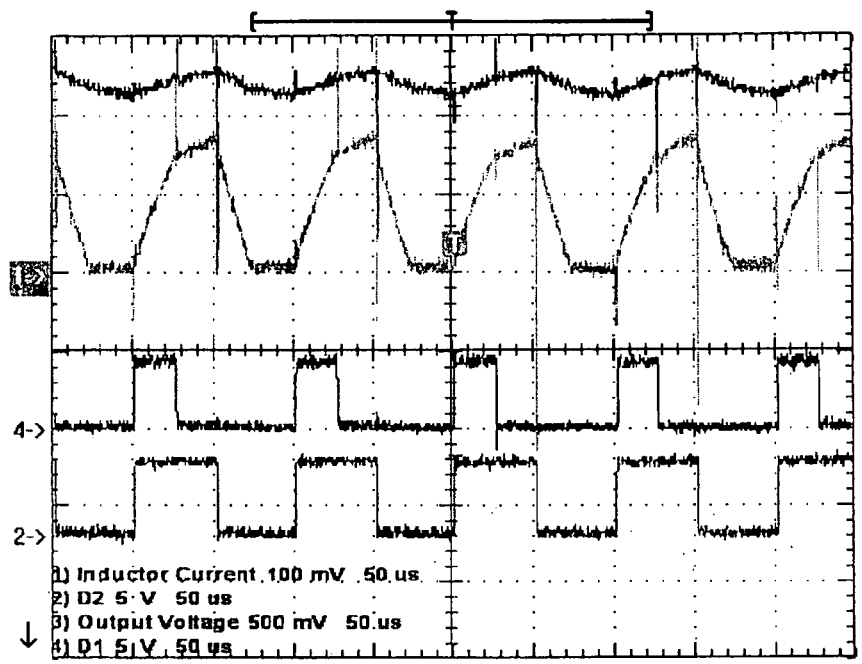
FIG. 13 is four graphs of two duty cycles, an output voltage and an inductor current of the converter in buck operating topology in the first case discontinuous conduction mode according to one embodiment of this invention.
Figure 14:
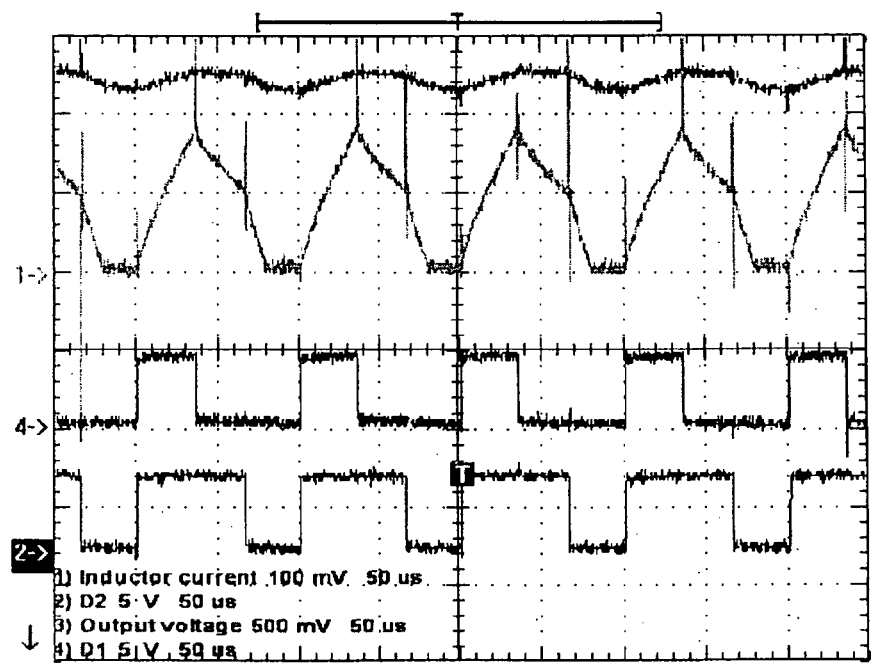
FIG. 14 is four graphs of two duty cycles, an output voltage and an inductor current of the converter in buck operating topology in the second case discontinuous conduction mode according to one embodiment of this invention.

FIGS. 13 and 14 present the output voltage, inductor current, and duty cycles of bidirectional switches for converter 10 operating in DCM, respectively, which correspond to simulation results of FIGS. 7 and 8.

Thus, the invention provides a multiple-input bidirectional converter. The invention provides a positive output without any additional transformer. In addition the converter requires few components, operates in different converter topologies (buck, boost and buck-boost), provides bidirectional operation, and is capable of transferring power from multiple voltage sources simultaneously.

It will be appreciated that details of the foregoing embodiments, given for purposes of illustration, are not to be construed as limiting the scope of this invention. Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention, which is defined in the following claims and all equivalents thereto. Further, it is recognized that many embodiments may be conceived that do not achieve all of the advantages of some embodiments, particularly of the preferred embodiments, yet the absence of a particular advantage shall not be construed to necessarily mean that such an embodiment is outside the scope of the present invention.

What is claimed is:

1. A DC-DC converter comprising:
a converter input comprising a first input voltage electrically connected to a first bidirectional switch and a second input voltage electrically connected to a second bidirectional switch, wherein the first bidirectional switch and the second bidirectional switch each comprise a pair of controllable switches in a parallel connection;
an output of the converter input electrically connected with both an inductor and a third bidirectional switch, the third bidirectional switch connected to a ground and the inductor connected to a fourth bidirectional switch and a fifth bidirectional switch, the fourth bidirectional switch connected to the ground and the fifth bidirectional switch connected to a voltage output in connection with a capacitor, wherein the third bidirectional switch comprises a transistor and a diode in parallel, the fourth bidirectional switch comprises a transistor and a diode in parallel and the fifth bidirectional switch comprises a transistor and a diode in parallel;
wherein the first bidirectional switch and the second bidirectional switch can be on to transfer energy simultaneously to the voltage output; and
wherein the voltage output is bucked, boosted or buck-boosted relative to one of the first input voltage or the second input voltage and the voltage output is a same polarity relative to the first input voltage and the second input voltage without use of a transformer; and
wherein the converter operates bidirectionally to provide the output voltage to one of the voltage inputs and the one of the voltage inputs is bucked, boosted or buck-boosted relative to the output voltage and the output voltage is bucked, boosted or buck-boosted by turning on, turning off or switching each of the plurality of bidirectional switches.

2. The DC-DC converter of claim 1, wherein each of the bidirectional switches is switched on substantially simultaneously with a switched signal;
each of the bidirectional switches has a duty cycle;
a voltage index i is assigned to each voltage source connected to a voltage input of plurality of the voltage inputs such that V1>V2> ... Vn; and each of the bidirectional switches has an effective duty cycle $D_{\mathit{eff}(i)}$ of $$D_{\mathit{eff}(i)} = \begin{cases} 0, & D_i > \sum_{j=1}^{i-1} D_{\mathit{eff}(j)} \\ D_i - \sum_{j=1}^{i-1} D_{\mathit{eff}(j)}, & D_i \geq \sum_{j=1}^{i-1} D_{\mathit{eff}(j)} \end{cases}$$

such that a voltage at the voltage output $V_o$ $$V_o = \sum_i D_{\mathit{eff}(i)} V_i.$$

3. The DC-DC converter of claim 1, wherein the first bidirectional switch comprises two parallel MOSFETs and the second bidirectional switch comprises two parallel MOSFETs.

4. A method of operating the DC-DC converter of claim 1 in a buck mode, comprising:
providing a switching frequency with a period to the DC-DC converter;
switching the transistor of the third bidirectional switch off, the transistor of the fourth bidirectional switch off, the transistor of the fifth bidirectional switch off; and
switching at least the first bidirectional switch on for a buck duty cycle and off for a remainder of the period.

5. A method of operating the DC-DC converter of claim 1 in a boost mode, comprising:
providing a switching frequency with a period to the DC-DC converter;
switching the first bidirectional switch on;
switching the transistor of the third bidirectional switch off and the transistor of the fifth bidirectional switch off; and
switching the transistor of the fourth bidirectional switch on for a boost duty cycle and off for a remainder of the period.

6. A method of operating the DC-DC converter of claim 1 in a buck-boost mode, comprising:
providing a switching frequency with a period to the DC-DC converter;
switching the transistor of the third bidirectional switch and the fifth bidirectional switch off; and
switching at least one of the first bidirectional switch or the second bidirectional switch for a buck-boost duty cycle and off for a remainder of the period.

7. The DC-DC converter of claim 1, wherein the third bidirectional switch comprises a third transistor and a third diode in parallel, the fourth bidirectional switch comprises a fourth transistor and a fourth diode in parallel and the fifth bidirectional switch comprises a fifth transistor and a fifth diode in parallel.

8. The DC-DC converter of claim 7, wherein the converter operates in a buck mode when the fourth transistor and fifth transistor are off and either the converter input or the third diode conduct.

9. The DC-DC converter of claim 7, wherein the converter operates in a buck-boost mode when either the third diode and the fifth diode conduct or the fourth transistor and the converter input conduct.

10. The DC-DC converter of claim 7, wherein the converter operates in a boost mode when the converter input conducts and the third transistor is off and either the fourth transistor or the fifth diode conduct.

11. The DC-DC converter of claim 1, wherein the first input voltage is selected from the group consisting of a battery, a wind power device, a solar power device, a fuel cell, a photovoltaic cell and an ultracapacitor.

12. The DC-DC converter of claim 1, wherein the second input voltage is selected from the group consisting of a battery, a wind power device, a solar power device, a fuel cell, a photovoltaic cell and an ultracapacitor.

* * * * *